(12) United States Patent
    Amadini et al.

(10) Patent No.: US 10,808,855 B2
(45) Date of Patent: Oct. 20, 2020

(54) PRESSURE RELIEF VALVE FOR A PRESSURE REGULATOR AND PRESSURE REGULATOR COMPRISING SAID PRESSURE RELIEF VALVE

(71) Applicant: Pietro Fiorentini SPA, Arcugnano (IT)

(72) Inventors: Armando Amadini, Castelmella (IT); Paolo Calciolari, Lonigo (IT)

(73) Assignee: Pietro Fiorentini SPA, Arcugnano (VI) (IT)

( * ) Notice: Subject to any disclaimer, the term of this patent is extended or adjusted under 35 U.S.C. 154(b) by 0 days.

(21) Appl. No.: 15/317,829

(22) PCT Filed: Jun. 11, 2015

(86) PCT No.: PCT/IB2015/054430
    § 371 (c)(1),
    (2) Date: Dec. 9, 2016

(87) PCT Pub. No.: WO2015/189802
    PCT Pub. Date: Dec. 17, 2015

(65) Prior Publication Data
    US 2017/0122447 A1    May 4, 2017

(30) Foreign Application Priority Data
    Jun. 12, 2014   (IT) .............................. VI2014A0149

(51) Int. Cl.
    *G05D 11/00*    (2006.01)
    *F16K 17/04*    (2006.01)
    (Continued)

(52) U.S. Cl.
    CPC ........ *F16K 17/048* (2013.01); *B01D 46/4272* (2013.01); *G05D 16/0683* (2013.01); *Y10T 137/261* (2015.04)

(58) Field of Classification Search
    CPC .................................................. Y10T 137/261
    See application file for complete search history.

(56) References Cited

U.S. PATENT DOCUMENTS 2,732,853 A    1/1956  Schwarz
3,032,054 A *  5/1962  Irwin ................. G05D 16/0694
                                                        137/116.5

(Continued)

FOREIGN PATENT DOCUMENTS

DE    10 2004 006096 B3    9/2005
FR       2 317 699 A1      2/1977
GB         750 913 A       6/1956

OTHER PUBLICATIONS

International Preliminary Report on Patentability issued in PCT Application No. PCT/IB2015/054430, filed Jun. 11, 2015.

(Continued)

*Primary Examiner* — Robert K Arundale
(74) *Attorney, Agent, or Firm* — Workman Nydegger

(57) ABSTRACT

A pressure relief valve for a gas pressure regulator includes: a deformable and gas-tight, laminar element; an outflow channel that allows the passage of the gas between one side and the other of the laminar element including a precisely-sized hole; a shutter removably associated with the laminar element through a coupler that defines, for the shutter, a closed position of the outflow channel and an open position of the outflow channel; an elastic element interposed between the shutter and the laminar element in order to push the shutter towards the closed position. The couple includes a through hole belonging to the laminar element and a shaft slidingly inserted in the through hole, and the shutter is operatively connected to the shaft. The outflow channel is distinct from the through hole, as sealing is provided to prevent the passage of the gas between the through hole and the shaft.

11 Claims, 4 Drawing Sheets

(51) Int. Cl.
*G05D 16/06* (2006.01)
*B01D 46/42* (2006.01)

(56) References Cited

U.S. PATENT DOCUMENTS

| | | | | | |
|---|---|---|---|---|---|
| 3,042,064 | A | * | 7/1962 | Pommersheim | F16K 31/165 137/116.5 |
| 3,160,169 | A | * | 12/1964 | Peterson | G05D 16/0683 137/116.5 |
| 3,705,599 | A | * | 12/1972 | Sheward | G05D 16/0688 137/116.5 |
| 4,019,534 | A | * | 4/1977 | Clements | F16K 1/52 137/614.18 |
| 4,966,183 | A | * | 10/1990 | Williamson, Jr. | G05D 16/0663 137/116.5 |
| 5,062,449 | A | * | 11/1991 | Woollums | G05D 16/02 137/116.5 |
| 6,167,905 | B1 | * | 1/2001 | Malloy | G05D 16/0688 137/484.4 |
| 6,390,134 | B1 | * | 5/2002 | Hanby | B23K 9/32 138/44 |
| 6,554,017 | B2 | * | 4/2003 | Berger | G05D 16/0663 137/115.13 |
| 7,950,412 | B2 | * | 5/2011 | Nguyen | E03D 1/32 137/441 |
| 8,122,912 | B2 | * | 2/2012 | Shemer | G05D 7/0186 138/43 |
| 8,256,446 | B2 | * | 9/2012 | Hawkins | F16K 31/165 137/116.5 |
| 2010/0147400 | A1 | | 6/2010 | Hawkins et al. | |
| 2012/0111425 | A1 | * | 5/2012 | Hawkins | G05D 16/0683 137/489 |

OTHER PUBLICATIONS

International Search Report and Written Opinion dated Sep. 3, 2015, issued in PCT Application No. PCT/IB2015/054430, filed Jun. 11, 2015.

* cited by examiner

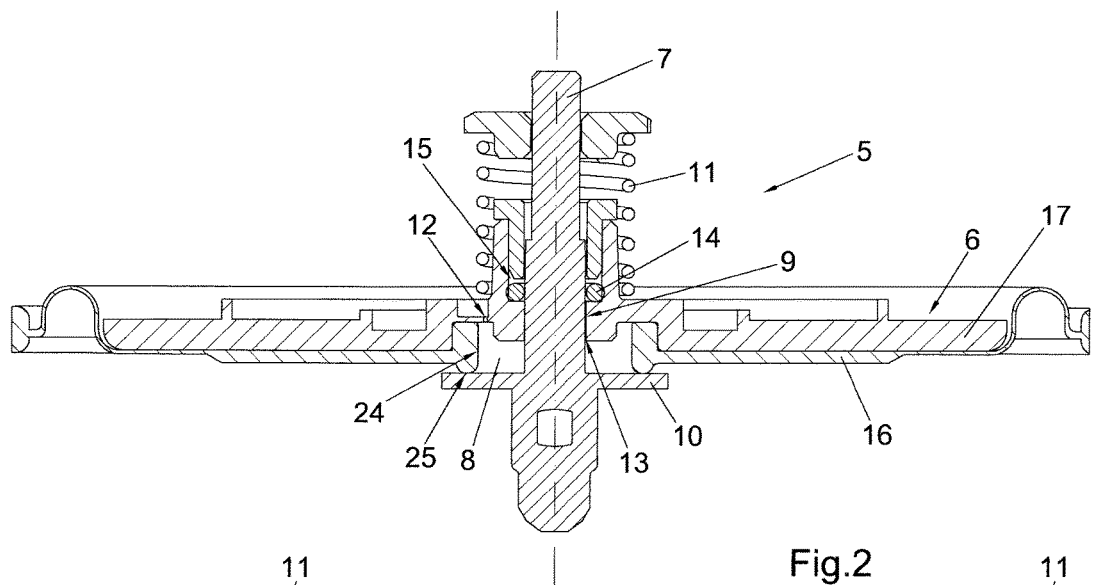
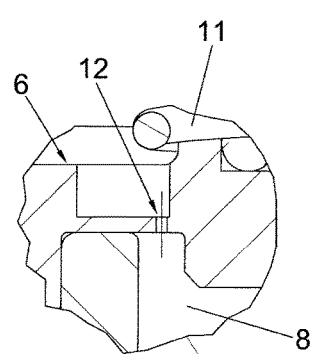
Fig.4
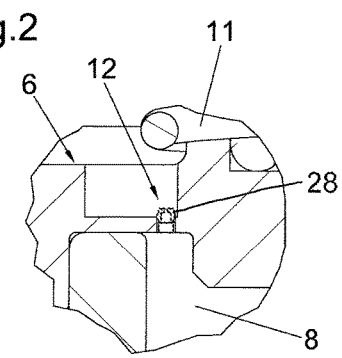
Fig.4A
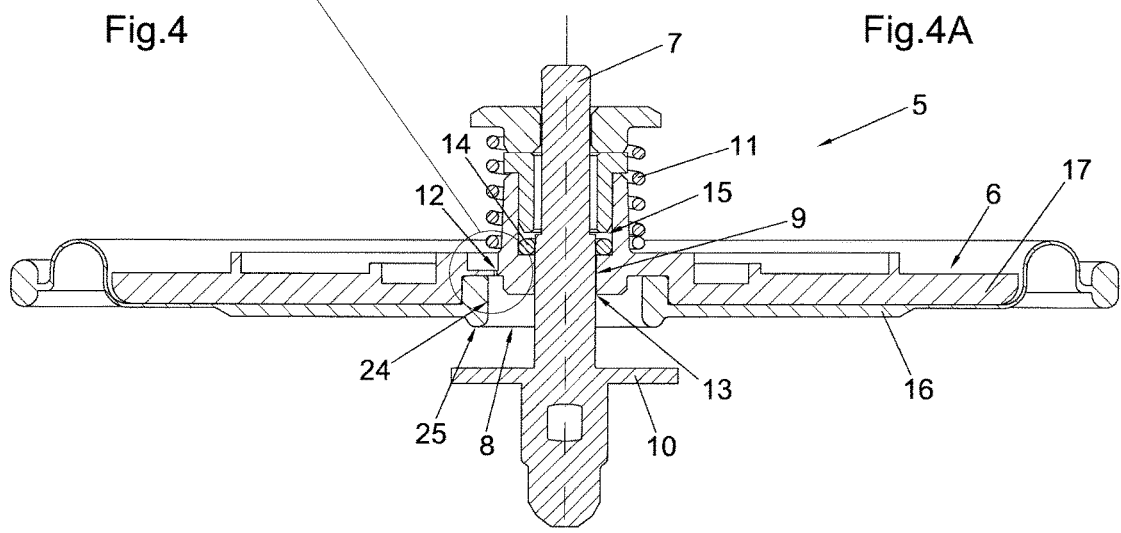
Fig.3

PRESSURE RELIEF VALVE FOR A PRESSURE REGULATOR AND PRESSURE REGULATOR COMPRISING SAID PRESSURE RELIEF VALVE

BACKGROUND OF THE INVENTION

1. Field of the Invention

The present invention concerns a pressure relief valve for a gas pressure regulator, particularly suited to be used in pressure regulators to be found in distribution networks of natural gas, LPG or other gases.

The present invention concerns also a pressure regulator comprising said pressure relief valve.

2. Present State of the Art

As is known, in natural gas distribution networks pressure regulators are used that make it possible to deliver natural gas at a pressure equal to an adjustable setting value.

Said pressure regulators comprise a regulation duct through which the gas flows and in which a movable shutter is arranged.

The regulator comprises also a regulation chamber that is subject to the gas delivery pressure, delimited by a deformable membrane associated with the movable shutter.

The setting value of the regulator is set by means of a spring associated with the deformable membrane.

During operation, a variation in the gas delivery pressure with respect to the setting value causes the deformable membrane, and therefore the shutter, to move, in such a way as to restore the gas delivery pressure.

The pressure regulator comprises also a pressure relief valve that releases the gas towards the outside of the regulator when the gas pressure in the regulation duct exceeds a pre-established threshold value that generally is slightly above the setting value of the pressure regulator when the flow rate is equal to zero.

The above may occur, for example, when there is no flow due to thermal expansion of the gas downstream of the shutter, or due to the rapid closing of a valve arranged downstream of the regulator.

Said pressure relief valve comprises a through hole made in the deformable membrane, in which a shaft is slidingly inserted with minimum clearance, a second shutter being associated with said shaft.

In normal operating conditions, a spring maintains the second shutter in contact with the deformable membrane, in such a way as to close the hole and prevent the gas from flowing out of the pressure regulator.

In the presence of overpressure, the deformable membrane moves until the shutter of the regulator is completely open.

Successively, the gas pressure on the deformable membrane overcomes the force of the spring of the second shutter, in such a way as to open the pressure relief valve.

In this way, the gas is released towards the outside of the pressure regulator through the clearance present between the hole in the membrane and the shaft.

When the gas pressure lowers again below the threshold value, the pressure relief valve is closed by the spring, restoring the normal conditions of the pressure regulator.

Said pressure regulator and, in particular, the respective pressure relief valve pose the drawback that they do not allow the flow rate of the gas released towards the outside of the regulator to be controlled.

In fact, said flow rate depends on the size of the clearance between the hole in the deformable membrane and the shaft of the second shutter, which can never be predetermined with precision.

Document DE 102004006096 B3 discloses a gas pressure regulator comprising a safety release valve formed as two mutually coaxial valves combined to form a unit and responding to corresponding different pressures.

SUMMARY OF THE INVENTION

It is the object of the present invention to provide a pressure relief valve for a pressure regulator that makes it possible to release the gas with a controlled flow rate.

Said object is achieved by a pressure relief valve in accordance with claim 1.

Said object is also achieved by a pressure regulator comprising said pressure relief valve, in accordance with claim 10.

BRIEF DESCRIPTION OF THE DRAWINGS

Said object is highlighted in the following description of a preferred embodiment of the invention and of some variant embodiments of the same, provided by way of non-limiting examples with reference to the attached drawings, wherein:

FIG. 2 shows a sectional view of the pressure relief valve of the invention in the closed configuration;

FIG. 3 shows the pressure relief valve of FIG. 2 in the open configuration;

FIG. 4 shows an enlarged detail of FIG. 2;

FIG. 4A shows an alternative of the enlarged detail of FIG. 4 where a plug having a precisely-sized hole is used.

DETAILED DESCRIPTION OF THE PREFERRED EMBODIMENTS

The pressure relief valve of the invention is described with reference to a pressure regulator 1 of the type suited to be installed along a natural gas distribution network.

Figure 1:
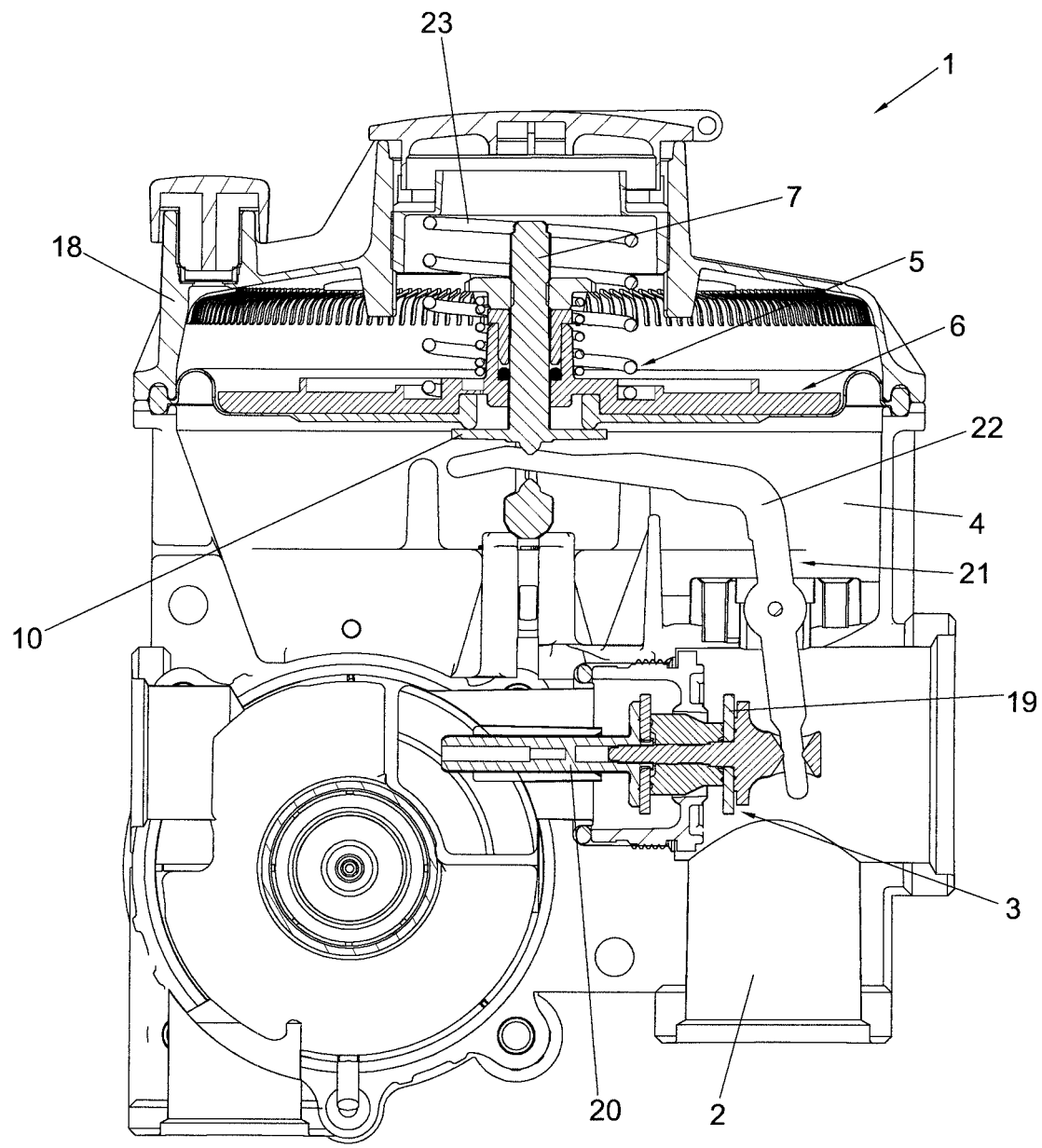
FIG. 1 shows a sectional view of a pressure regulator comprising the pressure relief valve of the invention.

Said pressure regulator, indicated as a whole by 1 in FIG. 1, comprises a main body 18 that delimits a regulation duct 2 for the gas flow, along which there are valve means 3 suited to regulate the pressure of the gas itself.

By varying the degree of opening of said valve means 3 it is possible to regulate the gas flow rate in such a way as to maintain its pressure constant downstream of the valve means 3 themselves.

Preferably, the valve means 3 comprise a valve body 19 slidingly associated with the main body 18 of the regulator 1 through a stem 20.

For the adjustment of the valve means 3, the pressure regulator 1 is provided with a regulation chamber 4 placed in communication with the portion of the regulation duct 2 that is arranged downstream of the valve means 3.

It can be understood that the pressure in the regulation chamber 4 is equal to the pressure of the gas that flows out of the pressure regulator 1.

The regulation chamber 4 is delimited on one side by a deformable and gas-tight, laminar element 6.

The deformability of the laminar element 6 allows the latter to move under the action of the gas pressure in the regulation chamber 4.

The laminar element 6 is operatively associated with said valve means 3 through a connection unit 21 configured in such a way that a pressure increase in the regulation chamber 4 corresponds to a reduced degree of opening of the valve means 3 and vice versa in the case of a decrease in pressure.

A counteracting element 23, for example a spring, is also provided, which is suited to exert on the laminar element 6 an opposite force with respect to the gas pressure in the regulation chamber 4, in such a way as to define the setting value of the pressure regulator 1.

Preferably, the force of the counteracting element 23 can be adjusted in order to allow the setting value to be modified, for example through an adjusting screw that varies the degree of compression of said spring.

The pressure regulator 1 comprises also a pressure relief valve 5, configured in such a way as to allow the gas to be released out of the pressure regulator 1 when its pressure exceeds a threshold level above the setting value of the pressure regulator when the flow rate is equal to zero.

Preferably, the threshold value exceeds the setting value by a few millibars.

As can be observed in FIG. 2, the pressure relief valve 5 comprises an outflow channel 8 that, in special conditions, allows the passage of the gas from one side of the laminar element 6 to the other, as will be shortly explained.

Preferably, said outflow channel 8 belongs to the laminar element 6.

The pressure relief valve 5 furthermore comprises a shutter 10 that is removably associated with the laminar element 6 through coupling means 9.

Said coupling means 9 define, for the shutter 10, a closed position, illustrated in FIG. 2, in which the shutter 10 closes the outflow channel 8 in such a way as to prevent the passage of the gas, and an open position, illustrated in FIG. 3, in which the outflow channel 8 remains open.

The pressure relief valve 5 comprises also an elastic element 11, interposed between the shutter 10 and the laminar element 6, configured so as to push the shutter 10 in said closed position.

According to the invention, the outflow channel 8 comprises a precisely-sized hole 12.

Said precisely-sized hole 12 makes it possible to define with high precision the flow rate of the gas that is released through the pressure relief valve 5 at the pressure corresponding to the threshold value, in such a way as to achieve the object of the invention.

Preferably, the diameter of the precisely-sized hole 12 is such as to allow the passage of a gas flow rate corresponding to the maximum value allowed for the pressure regulator 1 when the gas pressure downstream of the valve means 3 is equal to the threshold value of the pressure relief valve 5.

Preferably, the diameter of the precisely-sized hole 12 does not exceed 1 mm.

By way of example, with a precisely-sized hole 12 with diameter included between 0.35 and 0.40 mm and length equal to 0.5 mm, the flow rate of the pressure relief valve 5 with a gas pressure equal to 70 mbar is approximately 30 l/h.

Preferably, and as shown in FIG. 4, said outflow channel 8 belongs to the laminar element 6.

Said option is particularly advantageous if the laminar element 6 is obtained by moulding a plastic material, as it allows the outflow channel 8 to be created during the moulding operation.

Preferably, the pressure relief valve 5 comprises also a filter facing the precisely-sized hole 12, not represented in the drawings but known per se, which is suited to prevent the precisely-sized hole 12 from being blocked by dust or similar materials.

Preferably, the filter is made of a sintered material that is particularly suited for said purpose.

As regards the coupling means 9 that allow the relative movement of the shutter 10 with respect to the laminar element 6, they preferably comprise a shaft 7 operatively associated with the shutter 10 and slidingly inserted in a through hole 13 belonging to the laminar element 6.

In particular, when the shutter 10 is in the closed position, it is in contact with the laminar element 6.

In this operating configuration, the shutter 10 and the laminar element 6 move integrally with each other.

Preferably, the shaft 7 of the pressure relief valve 5 is operatively associated with the valve means 3 through a lever 22, or through lever systems or other equivalent kinematic mechanisms.

Figure 5:
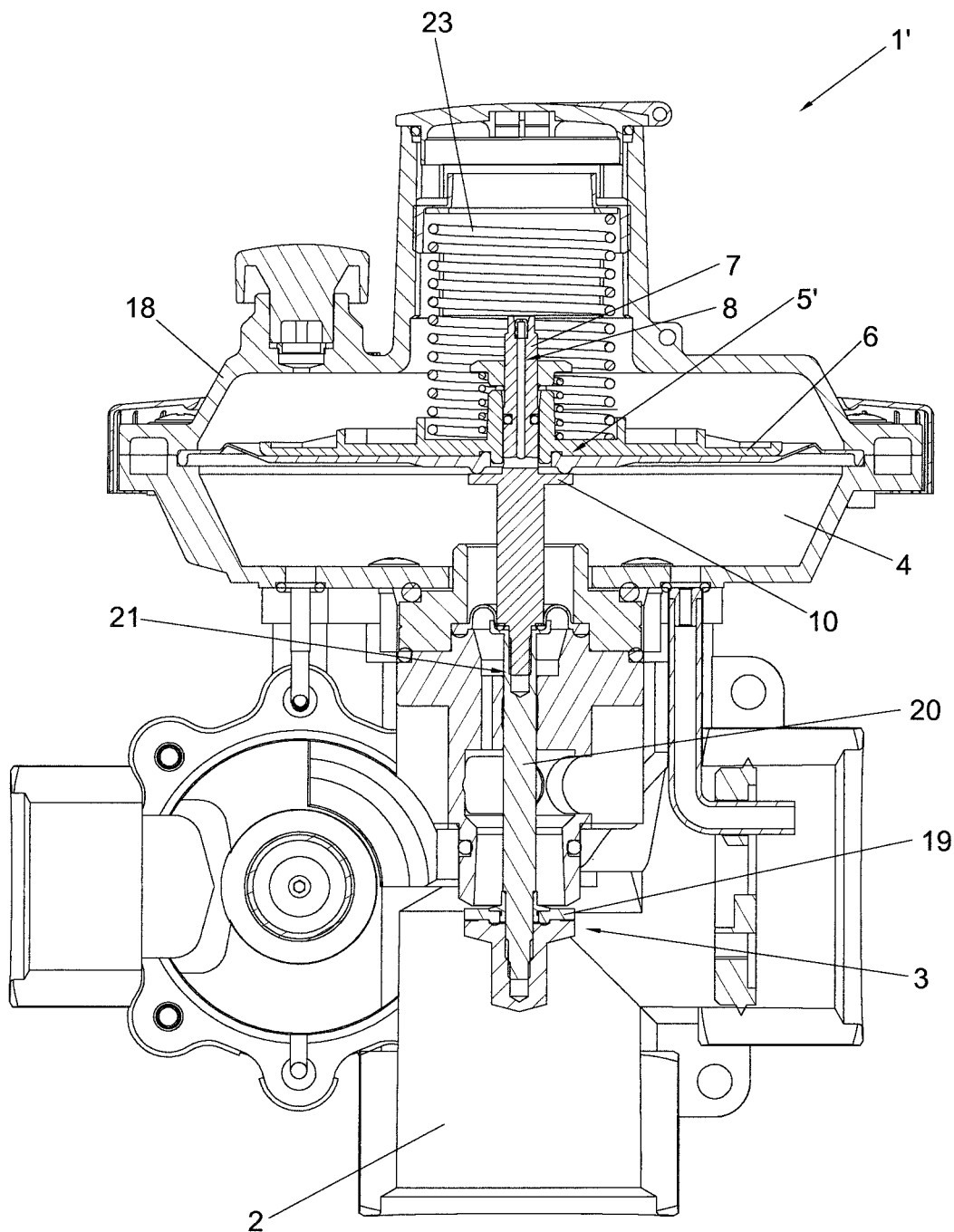
FIG. 5 shows a sectional view of a pressure regulator comprising a pressure relief valve according to a variant embodiment of the invention.

According to a variant embodiment of the invention illustrated in FIG. 5, the shaft 7 is integrally associated with the stem 20 of the valve means 3 of the pressure regulator.

In any case, sealing means 14 are preferably provided, which prevent the passage of the gas between said through hole 13 and the shaft 7.

Advantageously, said sealing means 14 ensure that the gas is released exclusively, or almost exclusively, through the precisely-sized hole 12.

Preferably, said sealing means 14 comprise a gasket interposed between the laminar element 6 and the shaft 7, for example an annular gasket of the O-ring type, or any other equivalent type of gasket.

Preferably, said gasket is configured in such a way as to allow the sliding movement of the shaft 7 in the through hole 13 with minimum friction.

Advantageously, the limited friction between the shaft 7 and the through hole 13 facilitates the opening of the pressure relief valve 5, ensuring that said opening movement is performed when the pre-established overpressure is reached and limiting any opening delay.

Preferably, said condition is achieved by maintaining an overall diametral interference between the gasket, the laminar element 6 and the shaft 7 included between 0.05 mm and 0.15 mm.

Said reduced interference minimizes friction and reduces any possible gas leakage to a flow rate that in any case is negligible compared to that of the gas flowing through the precisely-sized hole 12.

Preferably, the gasket is associated with a seat 15 that allows it to slide a little in the direction of movement of the shutter 10.

Advantageously, said sliding movement facilitates the relative movement between the shutter 10 and the laminar element 6 in the case where the gasket tends to adhere to one of the two components, as can happen as a result of prolonged operation of the pressure relief valve 5.

As regards the laminar element 6, it preferably comprises a deformable membrane 16 associated with a rigid support disc 17.

Preferably, the support disc 17 is smaller than the deformable membrane 16, in such a way as to allow a perimeter portion of the deformable membrane 16 to deform. The said perimeter portion is associated with the body 18 of the pressure regulator 1 in such a way as to close the regulation chamber 4.

In particular, the through hole 13 in which the shaft 7 is slidingly inserted preferably belongs to the support disc 17, to the advantage of precision in the sliding movement of the shaft 7.

Furthermore, the deformable membrane 16 is preferably provided with a central through hole 24 whose diameter exceeds the diameter of the through hole 13 in the support disc 17, while the outflow channel 8 is made in the central area of the support disc 17, at the level of said central hole 24 in the deformable membrane 16.

Said configuration makes it easier to drill the precisely-sized hole 12, as it runs through a single component, that is, the support disc 17.

Preferably, the central hole 24 is provided with a raised perimeter edge 25 on which the shutter 10 rests when it is closed, in order to obtain gas tightness.

Figure 6:
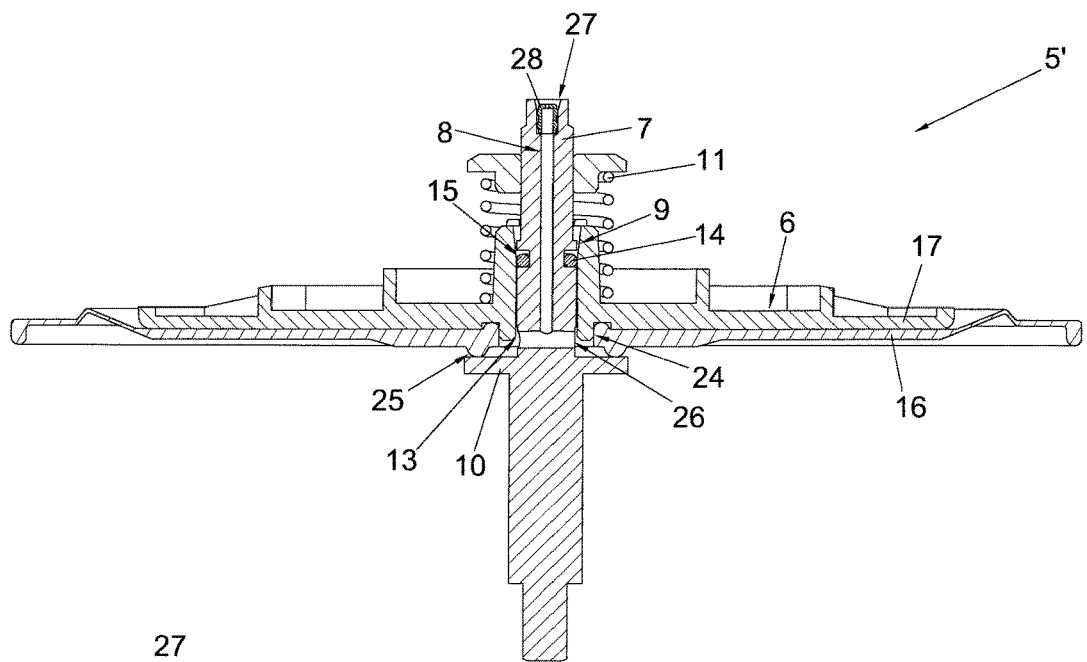
FIG. 6 shows a sectional view of the pressure relief valve of the regulator of FIG. 5 in the closed configuration.

According to a variant embodiment of the pressure relief valve that is the subject of the invention, indicated as a whole by 5' in FIG. 6, the outflow channel 8 belongs to the coupling means 9 connecting the shutter 10 to the laminar element 6 and, in the case at hand, to the shaft 7.

In particular, said outflow channel 8 extends between two openings 26, 27, of which a first opening 26 is arranged in such a way that, when the shutter 10 is in the open position, it is interposed between the shutter 10 and the laminar element 6, while the second opening 27 is arranged on the other side with respect to the laminar element 6.

Figure 8:
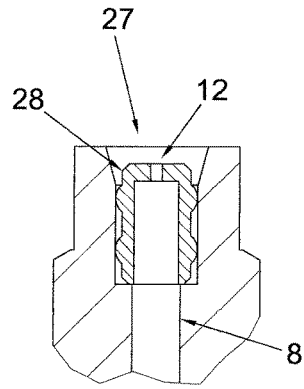
FIG. 8 shows an enlarged detail of FIG. 7.

Furthermore, preferably and as shown in FIG. 8, the precisely-sized hole 12 is made in a plug 28 inserted in the outflow channel 8.

Obviously, the plug 28 can be in any shape, even different from that shown in the figures.

Advantageously, said plug 28 makes it easier to drill the precisely-sized hole 12.

Still advantageously, by making plugs provided with precisely-sized holes having different diameters, it is possible to choose the precisely-sized hole that corresponds to the required flow rate by simply changing plug, with no need to modify the other components of the valve itself.

Obviously, said plug 28 can be applied also to the pressure relief valve 5 of the previous variant embodiment. For example, as depicted in FIG. 4A, plug 28 having precisely-sized hole 12 is disposed within outflow channel 8.

It is also evident that said pressure relief valve 5' can be provided with all the options previously described with regard to the previous embodiment, with the necessary adaptations.

In practice, in the normal operating configuration of the pressure regulator 1, the shutter 10 remains in the closed position illustrated in FIGS. 2 and 6.

In said closed position, the valve means 3, operated by the laminar element 6, maintain the gas pressure downstream of the valve means 3 at the setting value.

In the presence of gas overpressure, the laminar element 6 is first pushed in an end-of-stroke position, which determines the maximum opening of the valve means 3.

Figure 7:
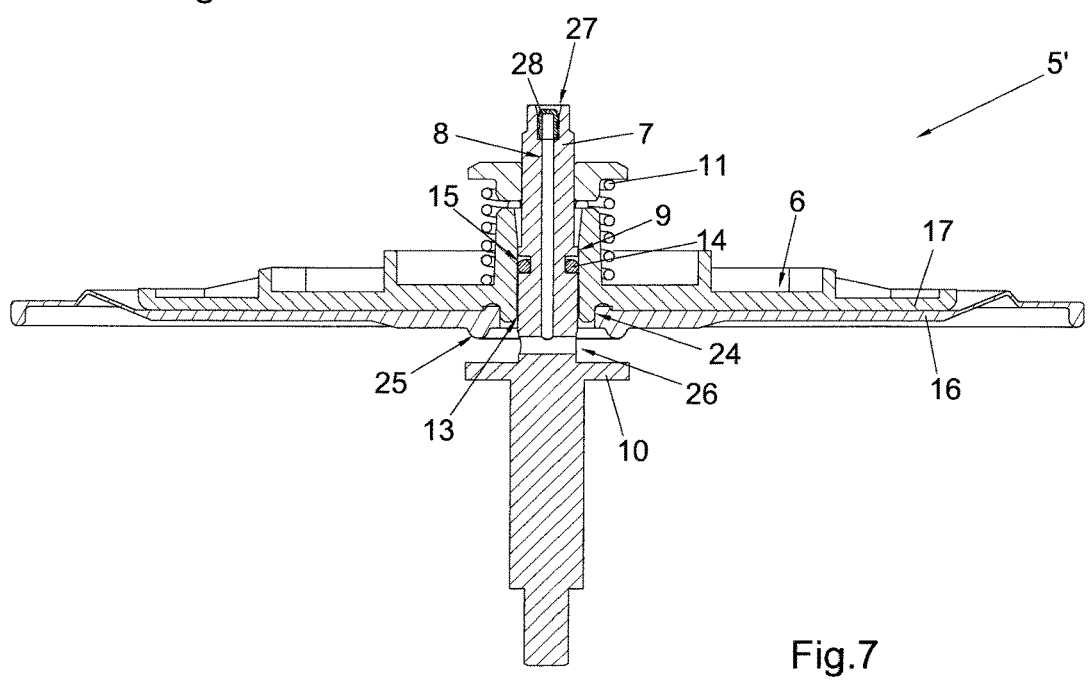
FIG. 7 shows the valve of FIG. 6 in the open configuration.

If the overpressure exceeds also the threshold value, it overcomes the force of the elastic element 11 of the pressure relief valve, opening the shutter 10, as shown in FIGS. 3 and 7.

In this last open position of the shutter 10, the gas flows out of the regulation chamber 4 towards the outside of the pressure regulator 1 through the outflow channel 8, at the flow rate defined by the precisely-sized hole 12.

According to the explanation provided above, it can be understood that the pressure relief valve described above and the pressure regulator comprising it, as well as the respective variant embodiments, all achieve the set object.

In fact, the presence of a precisely-sized hole along the outflow channel makes it possible to pre-determine, with high precision, the flow rate of the gas that flows out through the pressure relief valve in the presence of a pre-determined gas overpressure.

The invention claimed is:

1. A pressure relief valve for a gas pressure, comprising:
a deformable and gas-tight, laminar element comprising a deformable membrane and a rigid support disc associated with said deformable membrane, the deformable membrane having a top side and an opposing bottom side with a hole passing through the deformable membrane between the top side and bottom side, a raised edge outwardly projecting from the bottom side of the deformable membrane so as to encircle the hole passing through the deformable membrane;
an outflow channel suited to allow the passage of said gas between one side and the other of said laminar element comprising a precisely-sized hole, said outflow channel passing through said rigid support disc and communicating with the hole passing through the deformable membrane;
a shutter removably associated with said laminar element through coupling means that define for said shutter a closed position, in which said shutter closes said outflow channel by directly pressing against the raised edge of deformable membrane in such a way as to prevent said passage of said gas, and an open position, in which said shutter leaves said outflow channel open;
an elastic element suited to thrust said shutter towards said closed position;
said coupling means comprising a through hole belonging to said laminar element and a shaft slidingly inserted in said through hole, said shutter being operatively connected to said shaft;
wherein said outflow channel is distinct from said through hole;
sealing means are provided for preventing the passage of said gas between said through hole and said shaft, the sealing means comprising an annular seal that encircles the shaft, the shaft moving independent of the seal as the shutter moves between the closed position and the open position;
an annular lip outwardly projects from the top side of the deformable membrane so as to encircle the hole passing through the deformable membrane, the annular lip projecting into a recess formed on the rigid support disc;
wherein said precisely-sized hole is made in a plug removably inserted in said outflow channel.

2. The pressure relief valve according to claim 1, wherein said elastic element presses against said rigid support disc.

3. The pressure relief valve according to claim 1, wherein said outflow channel belongs to said laminar element.

4. The pressure relief valve according to claim 1, wherein said sealing means comprise an annular gasket interposed between said shaft and said laminar element, mounted with an overall diametral interference included between 0.05 mm and 0.15 mm.

5. The pressure relief valve according to claim 1, wherein the diameter of said precisely-sized hole does not exceed 1 mm.

6. The pressure relief valve according to claim 1, wherein the shutter has a planar top surface that directly pressing against the raised edge of deformable membrane.

7. The pressure relief valve according to claim 1, wherein the diameter of said precisely-sized hole is in a range between 0.35 mm and 0.40 mm and has a length of 0.5 mm.

8. The pressure relief valve according to claim 1, wherein the raised edge terminates at a rounded surface against which the shutter contacts.

9. The pressure relief valve according to claim 1, wherein the shaft and the shutter are integrally formed as a single, unitary structure.

10. A pressure relief valve for a gas pressure, comprising:
a deformable and gas-tight, laminar element comprising a deformable membrane and a rigid support disc associated with said deformable membrane, the deformable membrane having a top side and an opposing bottom side with a hole passing through the deformable membrane between the top side and bottom side, a raised edge outwardly projecting from the bottom side of the deformable membrane so as to encircle the hole passing through the deformable membrane;
an outflow channel suited to allow the passage of said gas between one side and the other of said laminar element comprising a precisely-sized hole, said outflow channel passing through said rigid support disc and communicating with the hole passing through the deformable membrane;
a shutter removably associated with said laminar element through coupling means that define for said shutter a closed position, in which said shutter closes said outflow channel by directly pressing against the raised edge of deformable membrane in such a way as to prevent said passage of said gas, and an open position, in which said shutter leaves said outflow channel open;
an elastic element suited to thrust said shutter towards said closed position;
said coupling means comprising a through hole belonging to said laminar element and a shaft slidingly inserted in said through hole, said shaft and said shutter being integrally formed as a single, unitary structure;
wherein said outflow channel is distinct from said through hole;
sealing means are provided for preventing the passage of said gas between said through hole and said shaft;
an annular lip outwardly projects from the top side of the deformable membrane so as to encircle the hole passing through the deformable membrane, the annular lip projecting into a recess formed on the rigid support disc;
wherein said precisely-sized hole is made in a plug removably inserted in said outflow channel.

11. A gas pressure regulator comprising:
a regulation duct suited to regulate the flow of said gas;
valve means arranged in said regulation duct for regulating the flow rate of said gas along said regulation duct;
a regulation chamber communicating with a portion of said regulation duct that is arranged downstream of said valve means according to the outflow direction of said gas;
the pressure relief valve according to claim 1;
said laminar element of said pressure relief valve at least partially delimiting said regulation chamber and being operatively associated with said valve means in order to move them.

* * * * *